(12) United States Patent
Choy et al.

(10) Patent No.: US 9,866,634 B1
(45) Date of Patent: Jan. 9, 2018

(54) MANAGING AND ACCESSING DATA STORAGE SYSTEMS

(71) Applicant: Western Digital Technologies, Inc., Irvine, CA (US)

(72) Inventors: Kenneth Choy, San Jose, CA (US); Anirudha Deglurkar, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 175 days.

(21) Appl. No.: 14/498,320

(22) Filed: Sep. 26, 2014

(51) Int. Cl.
*G06F 15/167* (2006.01)
*H04L 29/08* (2006.01)
*G06F 17/30* (2006.01)
*H04L 12/26* (2006.01)

(52) U.S. Cl.
CPC ........ *H04L 67/1097* (2013.01); *G06F 17/301* (2013.01); *G06F 17/30197* (2013.01); *H04L 43/04* (2013.01)

(58) Field of Classification Search
None
See application file for complete search history.

(56) References Cited

U.S. PATENT DOCUMENTS

| | | | |
|---|---|---|---|
| 6,499,054 B1 | 12/2002 | Hesselink et al. | |
| 6,631,369 B1 | 10/2003 | Meyerzon et al. | |
| 6,732,158 B1 | 5/2004 | Hesselink et al. | |
| 7,107,296 B2 | 9/2006 | Novak et al. | |
| 7,120,692 B2 | 10/2006 | Hesselink et al. | |
| 7,454,443 B2 | 11/2008 | Ram et al. | |
| 7,467,187 B2 | 12/2008 | Hesselink et al. | |
| 7,546,353 B2 | 6/2009 | Hesselink et al. | |
| 7,587,467 B2 | 9/2009 | Hesselink et al. | |
| 7,600,036 B2 | 10/2009 | Hesselink et al. | |
| 7,788,404 B2 | 8/2010 | Hesselink et al. | |
| 7,827,146 B1 * | 11/2010 | De Landstheer ... | G06F 11/1451 707/651 |
| 7,917,628 B2 | 3/2011 | Hesselink et al. | |
| 7,934,251 B2 | 4/2011 | Hesselink et al. | |
| 7,949,564 B1 | 5/2011 | Hughes et al. | |
| 8,004,791 B2 | 8/2011 | Szeremeta et al. | |
| 8,255,661 B2 | 8/2012 | Karr et al. | |
| 8,285,965 B2 | 10/2012 | Karr et al. | |
| 8,341,117 B2 | 12/2012 | Ram et al. | |
| 8,341,275 B1 | 12/2012 | Hesselink et al. | |

(Continued)

*Primary Examiner* — Mohamed Wasel
*Assistant Examiner* — Phyllis A Book
(74) *Attorney, Agent, or Firm* — Change & Hale LLP

(57) ABSTRACT

Systems and methods are disclosed for editing metadata for data objects on a data storage device, which may be configured to identify data objects that have been modified and may be associated with storage locations of a file system. The data storage device may also be configured determine whether a first period of time has elapsed and may further be configured to determine whether a second period of time has elapsed or whether a threshold number of data objects in the file system have been modified in response to a first determination that the first time period has elapsed. The data storage device may further be configured to edit a set of metadata for a set of data objects in response to a second determination that the second period of time has elapsed or the threshold number of data objects in the file system have been modified.

20 Claims, 5 Drawing Sheets

(56) References Cited

U.S. PATENT DOCUMENTS

| | | | |
|---|---|---|---|
| 8,352,567 B2 | 1/2013 | Hesselink et al. | |
| 8,526,798 B2 | 9/2013 | Hesselink | |
| 8,631,284 B2 | 1/2014 | Stevens | |
| 8,646,054 B1 | 2/2014 | Karr et al. | |
| 8,661,507 B1 | 2/2014 | Hesselink et al. | |
| 8,688,797 B2 | 4/2014 | Hesselink et al. | |
| 8,713,265 B1 | 4/2014 | Rutledge | |
| 8,762,682 B1 | 6/2014 | Stevens | |
| 8,780,004 B1 | 7/2014 | Chin | |
| 8,793,374 B2 | 7/2014 | Hesselink et al. | |
| 8,819,443 B2 | 8/2014 | Lin | |
| 8,909,605 B1* | 12/2014 | Li | G06F 11/1464 707/674 |
| 9,015,181 B2* | 4/2015 | Kottomtharayil | G06F 11/1451 707/758 |
| 2005/0144195 A1 | 6/2005 | Hesselink et al. | |
| 2005/0144200 A1 | 6/2005 | Hesselink et al. | |
| 2008/0243878 A1* | 10/2008 | de Spiegeleer | G06F 11/1448 |
| 2009/0228473 A1 | 9/2009 | Kannan et al. | |
| 2010/0070466 A1* | 3/2010 | Prahlad | G06F 3/0605 707/609 |
| 2011/0145525 A1* | 6/2011 | Browne | G06F 3/0611 711/161 |
| 2012/0036041 A1 | 2/2012 | Hesselink | |
| 2012/0191724 A1* | 7/2012 | Tucek | G06F 17/30575 707/747 |
| 2012/0317077 A1 | 12/2012 | Chung | |
| 2013/0024424 A1* | 1/2013 | Prahlad | G06F 17/302 707/640 |
| 2013/0212401 A1 | 8/2013 | Lin | |
| 2013/0266137 A1 | 10/2013 | Blankenbeckler et al. | |
| 2013/0268749 A1 | 10/2013 | Blankenbeckler et al. | |
| 2013/0268759 A1 | 10/2013 | Blankenbeckler et al. | |
| 2013/0268771 A1 | 10/2013 | Blankenbeckler et al. | |
| 2014/0095439 A1 | 4/2014 | Ram | |
| 2014/0169921 A1 | 6/2014 | Carey | |
| 2014/0173215 A1 | 6/2014 | Lin et al. | |
| 2014/0304312 A1* | 10/2014 | Sydell | G06F 17/30893 707/825 |
| 2016/0019317 A1* | 1/2016 | Pawar | G06F 17/3007 707/649 |
| 2016/0026672 A1* | 1/2016 | Zhang | G06F 17/30091 707/686 |

* cited by examiner

MANAGING AND ACCESSING DATA STORAGE SYSTEMS

BACKGROUND

Distribution of data storage across one or more data storage devices may provide increased data security through data redundancy. Network-attached storage (NAS) devices provide access to data over computer networks.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments may be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claimed invention. Disclosed herein are example implementations, configurations, and/or embodiments relating to editing metadata for data objects stored in a files system of a data storage device.

Overview

Network-attached storage (NAS) drives/systems may provide file-level data storage over a computer network, wherein access to the stored data is accessible to a group of client devices. For example, a NAS device may include hardware, software, or a combination of such elements, configured such that the NAS device operates as a file server. NAS devices/systems may provide a convenient mechanism for sharing data among multiple computers and/or remotely accessing data stored on the NAS devices/systems. As compared to traditional file servers, benefits of NAS devices/systems may include the ability to access data from various locations (e.g., remote locations), faster data access, easier administration, and/or simpler configuration.

Certain embodiments disclosed herein provide the ability to edit metadata for one or more data objects that have been modified while maintaining and/or improving the performance of a data storage device, and/or extending the life of the data storage device, such as a NAS device. The NAS device may collapse, collect, batch, and/or combine edits to the metadata for data objects that have been modified using a queue of storage locations, a data object counter, and a list of data objects. The NAS device may also use a first time period and a second time period to help ensure that metadata for data objects that are modified are edited at some point in a timely manner (e.g., are edited at a time between the end of the first time period and the second time period).

While certain embodiments are disclosed herein in the context of NAS devices, the principles disclosed herein may be applicable to other types of data storage devices, such as direct-access storage (DAS) devices. The examples, embodiments, and/or implementations described herein may be applicable to various other types of data storage devices.

Data Storage System

Figure 1:
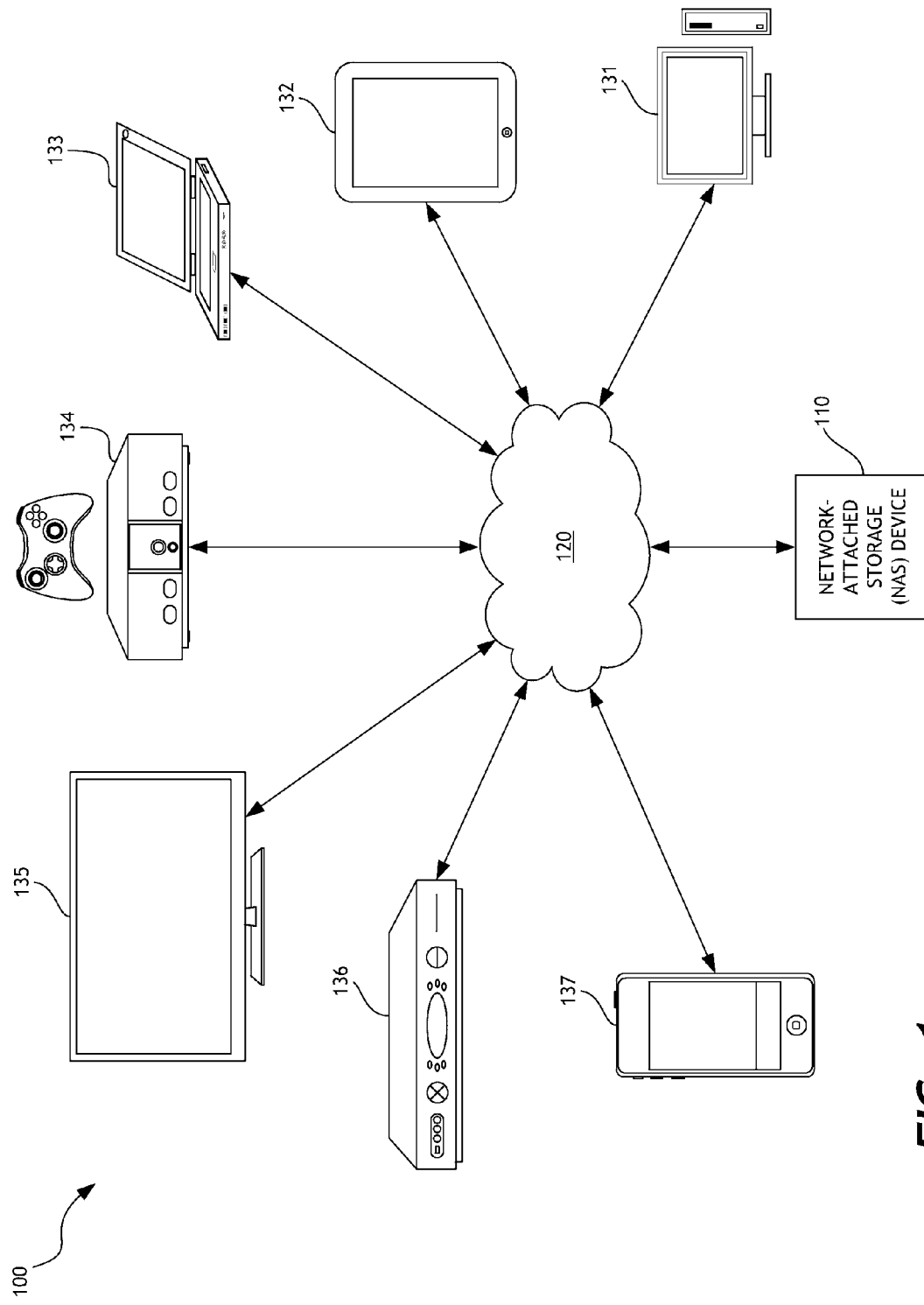
FIG. 1 is a diagram of a data storage system, according to an embodiment.

FIG. 1 is a diagram of a data storage system 100, according to an embodiment. The data storage system 100 includes a network-attached storage (NAS) device 110 is communicatively coupled to one or more client devices in order to provide file-based data storage services to other devices on the network 120. In one embodiment, network 120 may include a public network (e.g., the Internet), a private network (e.g., a local area network (LAN)), or wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other types of computer networks, and/or a combination thereof. Types of client devices that may have access to the NAS device 110 may include, but are not limited to, phones 137 (e.g., smart phones, cellular phones, etc.), cable set-top boxes 136, smart TV's 135, video game consoles 134, laptop computers 133, tablet computers 132, desktop computers 131, wearable computers and/or other network-connected computing devices.

The NAS device 110 device may provide various devices (e.g., phones 137, cable set-top boxes 136, smart TV's 135, video game consoles 134, laptop computers 133, tablet computers 132, desktop computers 131) with remote access to various types of user data stored on the NAS device 110. The NAS device 110 may also allow users to store various types of user data on the NAS device 110. The NAS device 110 may comprise magnetic media, hard disk media, and/or solid-state media. While certain description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), negative-AND (NAND) memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

In certain embodiments, the NAS device 110 provides file-based services. Alternatively, the NAS device 110 may be configured to run software to provide additional server functionality. In certain embodiments, the NAS device 110 may be configurable over the network 120 by a client device interface, such as a web browser of a mobile or desktop computing device or software (e.g., an application) installed on the mobile or desktop computing device. For example, a low-level operating system may be implemented in the NAS, such as FreeNAS, which is an open source NAS solution designed for commodity PC hardware. The NAS device 110 may provide access to files using one or more network file-sharing protocols, such as NFS, SMB/CIFS, AFP, or the like.

With further reference to FIG. 1, the NAS device 110 (e.g., magnetic disk drive, hybrid hard drive, solid-state drive, etc.) may include a controller (not shown in FIG. 1) configured to receive data commands and to execute such commands in one or more non-volatile memory components of the NAS device 110. Such commands may include data read/write commands, and the like. The controller may be configured to receive data commands from a storage interface residing on a computing device. Data commands may specify a block address in the NAS device 110 and data may be accessed/transferred based on such commands.

The NAS device 110 may be configured to store data in one or more magnetic recording disks and/or the solid state memory devices/arrays. In an embodiment, the NAS device 110 may comprise a cable box, a backup disk drive, a media storage unit, a streaming media device, a digital camera, or any other electronic device which may store data that may need to be accessed directly or wirelessly.

In certain embodiments, the NAS device 110 may store data received from a client device such that the NAS device 110 acts as data storage for the client device. To facilitate this function, the NAS device 110 may implement a logical interface. The logical interface may present to the client device memory as a set of logical addresses (e.g., sequential/contiguous addresses) where data may be stored. Internally, the NAS controller may map logical addresses to various physical memory addresses in the non-volatile memory of the NAS device 110. Mapping data indicating the mapping of logical addresses to physical memory addresses may be maintained in the NAS device 110.

In certain embodiments, the NAS device 110 may be a single, centralized unit connected to a Wi-Fi router via, for example, an Ethernet cable. One or more of the client devices (131-137) may share access to the NAS device 110 via a wide area network (WLAN), such as the Internet. In certain embodiments, data protection is achieved for the NAS device 110 using RAID (redundant array of inexpensive disks) technology, wherein multiple disk drive components are contained in the NAS for storing redundant data.

The NAS device 110 may include a file system (not shown in FIG. 1). The file system may include one or more storage locations. For example, the file system may include one or more folders and/or sub-folders. The file system may also include one or more data objects that are associated with one or more storage locations. For example, the file system may include one or more files, folders, and/or sub-folders stored in the one or more storage locations. The file system may also access and/or include various other data storages devices that may be coupled to the NAS device 110. For example, the file system may include a Secure Digital (SD) memory card that may be communicatively coupled to the NAS device 110. A data object may be associated with the storage location (e.g., a folder) where the data object is stored. Data objects (e.g., files, sub-folders, folders) may be modified by users. For example, data objects may be added, deleted, renamed, moved (e.g., moved from a first storage location to a second storage location), and/or updated (e.g., the contents of a data object may be updated) by a user of the NAS device 110.

The file system may also include metadata for one or more data objects. Metadata may be additional information and/or data that may describe the data object and/or the contents of the data object. For example, a timestamp (e.g., a data and/or time) may be metadata that indicates when a data object was last updated (e.g., last changed). Examples of metadata include, but are not limited to, a folder name, a timestamp (e.g., timestamps indicating when a data object was created and/or last updated), a name of a data object (e.g., file name), a size of a data object (e.g., size in bytes, kilobytes, megabytes, gigabytes, etc.), a length of a data object (e.g., length of a digital movie file or a digital music file), a storage location of data object (e.g., a path or a list of folders where the data object is stored), an author (e.g., a creator of the data object), a Multipurpose Internet Mail Extensions (MIME) type, a title, a height/width (e.g., height/width of an image file), a resolution (e.g., resolution of a digital image file or a digital movie file), a thumbnail/preview of a data object, a location (e.g., a geographical location wherein a digital image file was created/taken), etc. In one embodiment, the metadata for a data object may be separate from the data object. For example, the metadata (e.g., author, resolution, etc.) may be stored in a table or a database that is separate from the data object (e.g., separate from a file or folder). In one embodiment, the metadata for the one or more data objects may be stored in a central location of the file system. For example, a portion of the file system may be allocated and/or reserved for storing metadata.

Editing Metadata for Data Objects

Figure 2:
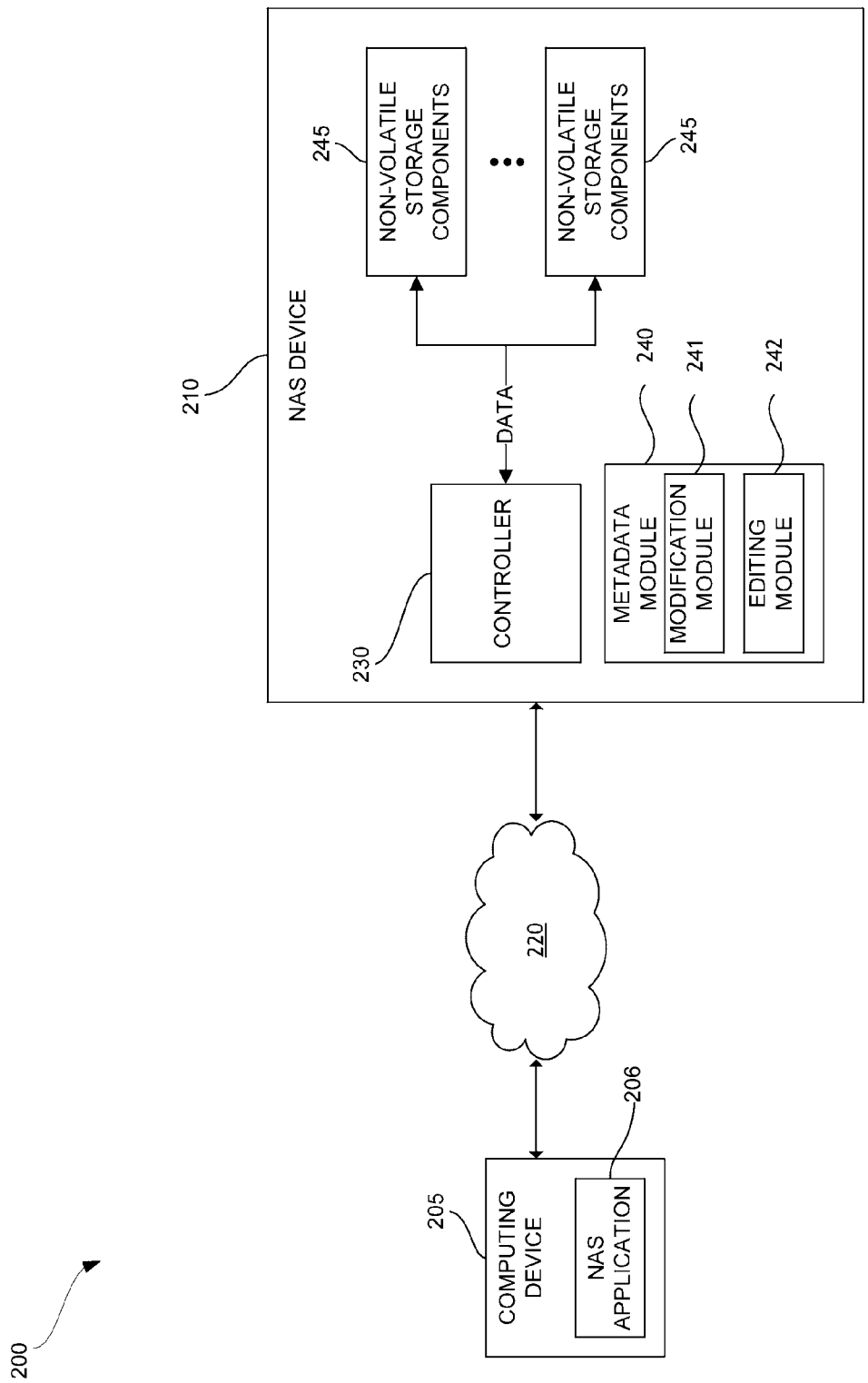
FIG. 2 is a diagram of a data storage system, according to an embodiment.

FIG. 2 is a diagram of a data storage system, according to an embodiment. The data storage system 200 includes a computing device 205 (e.g., a client device), a NAS device 210, and a network 220. The computing device 205 and the NAS device 210 may be communicatively coupled to each other via the network 220. The network 220 may include a public network (e.g., the Internet), a private network (e.g., a local area network (LAN)), a wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other type of computer network, and/or a combination thereof.

The NAS device 210 device may provide one or more computing devices (e.g., tablet computers, smart phones, laptop computers, desktop computers, etc.) with access to various types of user data stored on the NAS device 210. The NAS device 210 may also allow users to store various types of user data on the NAS device 210. As discussed above, the NAS device 210 may include a file system and the file system may include one or more data objects (e.g., one or more files and/or folders). The data objects may be stored in one or more storage locations (e.g., one or more folders and/or sub-folders).

The NAS device 210 may include a controller 230, a metadata module 240, and non-volatile storage components 245. In one embodiment, the non-volatile storage components 245 may include non-volatile magnetic media, and/or solid-state memory, such as NAND flash. The controller 230 may provide overall control for the NAS device 210. In certain embodiments, the NAS device 210 may be a hard disk drive. The non-volatile storage components 245 may include one or more disks and the NAS device 210 may further include one or more heads (not shown) actuated radially over the disk(s), and a spindle motor for rotating the disk(s). Alternatively to, or in addition to, magnetic rotating media, solid-state memory and/or other non-volatile memory such as MRAM and/or phase change memory may be used. In certain embodiments, the NAS device 210 may be, for example, a hybrid hard drive including both magnetic media and solid-state media.

The controller 230 may receive data and storage access commands from a storage interface 212 of a computing device 205. Storage access commands communicated by the storage interface 212 may include write and read commands issued by the computing device 205. The storage access commands may specify a logical block address (LBA), or range of LBAs, in the NAS device 210, and the controller 230 may execute the received storage access commands in the non-volatile storage components 245. In a hybrid hard drive, data may be stored in a magnetic media storage component as well as non-volatile solid-state memory.

The NAS device 210 may be configured to implement data redundancy, wherein user data stored in the non-volatile storage components 245 is maintained in one or more internal and/or external drives. For example, the controller 230 may include a data redundancy management module (not shown in FIG. 2) configured to implement redundancy functionality. The data redundancy management module may implement redundant array of independent disks (RAID) technology, wherein the non-volatile storage components 245 includes a plurality of internal drives, disks, or other data storage partitions combined into a logical unit for the purposes of data redundancy and performance improvement. In addition, or alternatively, the data redundancy management module may be configured to implement RAID using one or more internal memory modules in combination with one or more external memory devices, as discussed in greater detail below.

For RAID purposes, the non-volatile storage components 245 may include an array of one or more storage devices, such as hard disks or other memory modules that are configured to store user data. In certain embodiments, such internal memory modules/disks may be each directly coupled to the controller 230 to provide a high bandwidth interface for reading and writing user data. The non-volatile storage components 245 may include one or more additional memory modules configured to store parity information.

The controller 230 may be configured to divide and replicate user data among the physical RAID memory modules, providing storage virtualization; the array may be accessed by the computing device 205 as a single drive. Data may be distributed across the RAID memory modules/drives according to any desirable or practical RAID level, depending on the level of redundancy and/or performance desired. For example, the NAS device 210 may be configured to implement RAID 0, RAID 1, RAID 5, RAID 10, or other RAID technology, depending on data reliability, availability, performance and/or capacity considerations or requirements.

The computing device 205 includes an NAS application 206. The NAS application 206 may be an application that may allow a user to access, modify, and/or manage one or more data objects on the NAS device 210. For example, the NAS application 206 may allow a user to add (e.g., store, upload, etc.) new data objects (e.g., files and/or folders) to the file system of the NAS device 210. In another example, the NAS application 206 may allow the user to remove or delete one or more data objects on the file system of the NAS device 210. In a further example, the NAS application 206 may allow the user to update one or more data objects on the file system of the NAS device 210 (e.g., change the content of a file, move a file to a different folder, rename a file, etc.). The NAS application 206 may be used to manage the operation of the NAS device 210. For example, the NAS application 206 may be used to set access permissions for different users, storage space limits for different users, etc. In one embodiment, the NAS application 206 may use the metadata when accessing and/or managing the data objects on the NAS device 210. For example, the NAS application 206 may present the metadata for the data objects to a user so that the user may more easily or efficiently view, browse, and/or manage the data objects on the NAS device 210.

As discussed above, the data objects in the file system of the NAS device 210 may be associated with metadata. For example, a digital picture (e.g., a data object or file that includes a digital image) may be associated with metadata that includes the resolution (e.g., resolution in pixels) of the digital picture, the timestamp of the digital picture (e.g., a time and/or date when the digital picture was created), a size of the digital picture (e.g., bytes, kilobytes, megabytes, and/or gigabytes), etc. The metadata may also allow users to obtain information about a data object without opening and/or accessing the data object. For example, the metadata associated with the data object may indicate the author of the data object.

The metadata module 240 may manage and/or edit the one or more metadata associated with the data objects in the file system of the NAS device 210. The metadata module may edit the one or more metadata by adding metadata, deleting/removing metadata, and/or updating metadata. The metadata module 240 may be processing logic that includes hardware (e.g., circuitry, dedicated logic, programmable logic, microcode, etc.), software (e.g., instructions run on a processor to perform hardware simulation), firmware, or a combination thereof. In one embodiment, the metadata module 240 may create or generate metadata for a new data object when the new data object is added to the file system of the NAS device 210. In another embodiment, the metadata module 240 may delete or remove metadata for a data object when the data object is removed or deleted from the file system of the NAS device 210. In a further embodiment, the metadata module 240 may update metadata for a data object when the data object is updated. For example, if a digital image (e.g., a data object) is modified (e.g., the resolution of the digital image is changed), the metadata associated with the digital image may be updated or changed (e.g., the resolution indicated in the metadata may be updated or changed). The metadata module 240 includes modification module 241 and editing module 242. The modification module 241 and editing module 242 may each be processing logic that includes hardware (e.g., circuitry, dedicated logic, programmable logic, microcode, etc.), software (e.g., instructions run on a processor to perform hardware simulation), firmware, or a combination thereof.

In one embodiment, the modification module 241 may identify one or more data objects that have been modified (e.g., added, removed, updated, renamed, moved, etc.). For example, the modification module 241 may communicate with the controller 230 and/or other components of the NAS device 210 (e.g., other software and/or hardware) to determine when a data object has been modified. The modification module 241 may use a queue of storage locations to track and/or manage modifications to data objects in the file system (as discussed in more detail below). The modification module 241 may also use a list of data objects (or a table or other data structure) and a data object counter to track and/or manage modifications to data objects in the file system (as discussed in more detail below). In one embodiment, the data object counter may be used to track the number of data objects in the file system that have been modified since the last time the editing module 242 edited metadata.

In one embodiment, the modification module 241 may receive an event, message, and/or other data indicating that the data object has been modified (e.g., may receive an event or message from the controller 230), when a data object is modified. The modification module 241 may determine or identify a storage location associated with the data object. For example, the modification module 241 may determine or identify a folder (e.g., a file folder) where the data object is stored on the file system. The modification module 241 may determine whether the storage location is in the queue of storage locations (e.g., whether the storage location or data indicative of the storage location is already in the queue of storage locations). If the storage location is not in the queue of storage locations, the modification module 241 may add the storage location to the queue of storage locations. If the storage location is in the queue of storage locations (e.g., is already in the queue of storage locations), the modification module 241 may not add the storage location to the queue of storage locations. The modification module 241 may also add the data object to the list of data objects and may increase a data object counter. The data object counter may be used to determine whether the threshold number of data objects has been modified. The modification module 241 and/or the editing module 242 may remove storage locations from the queue of storage locations and/or may remove data objects from the list of data objects after the editing module 242 edits (e.g., adds, removes, or updates) metadata for the data objects in the list of data objects. The data objects in the list of data objects may also be associated with the storage locations in the queue of storage locations. The modification module 241 and/or the editing module 242 may also reset and/or decrement the data object counter after editing metadata associated with data objects that have been modified.

In one embodiment, the editing module 242 may edit one or more metadata associated with one or more data objects of the file system of the NAS device 210. The editing module 242 may determine whether a first period of time (e.g., a first time period such as five seconds) has elapsed. If the first time period has elapsed, the editing module 242 may determine whether a second period of time (e.g., thirty seconds) has elapsed or whether a threshold number of data objects in the file system have been modified. In some embodiments, the first timed period and the second time period may each be any period of time (e.g., seconds, minutes, hours, etc.). In other embodiments, the first time period may be smaller, larger, or equal to the second time period. In one embodiment, the second time period may include the first time period. For example, the second time period may run concurrently with the first time period and/or the first time period and the second time period may start at the same time.

If the threshold number of data objects in the file system have been modified or the second period of time has elapsed, the editing module 242 may edit (e.g., add, remove, update, etc.) the metadata associated with data objects that have been modified. For example, the editing module 242 may access the queue of storage locations and/or the list of data objects to identify data objects that have been modified and may edit the metadata associated with the data objects that have been modified. In one embodiment, the editing module 242 may edit metadata associated with data objects that are not in the list of data objects. For example, additional data objects may be modified (e.g., added, deleted, updated, etc.) while the modification module 241 analyzes the queue of storage locations and/or receives events. These additional data objects may not be in the list of data objects. The editing module 242 may analyze all the storage locations in the queue of storage locations and may identify additional data objects in the storage locations that have been modified but are not in the list of data objects. The editing module may also edit the metadata for the additional data objects. The modification module 241 and/or the editing module 242 may also remove storage locations from the queue of storage locations, may remove data objects from the list of data objects, and/or may reset/decrement the data object counter after the editing module 242 edits the metadata associated with the data objects that have been modified. Removing storage locations from the queue of storage location, resetting/decrementing the data object counter and/or removing data objects from the list of data objects may indicate that the metadata for the data objects in the list (and stored in the storage locations) has been edited.

As discussed above, modifying data objects and editing the metadata for the modified data objects may decrease the performance of the NAS device 210 and/or may decrease the life of the NAS device 210. For example, editing (e.g., adding, removing, updating) metadata for each data object after the data object is modified (e.g., created, added, removed, deleted, updated, changed, moved, renamed, etc.) may cause the NAS device 210 to frequently access different portions of the non-volatile storage components 245 (e.g., to frequently access different portions of a magnetic disk drive). This may increase the wear on components of the NAS device 210 (e.g., increase the wear on a motor). In another example, if a user copies a large number of data objects to the NAS device 210, time to copy the large number of data objects to the NAS device 210 may be increased if the NAS device 210 updates the metadata for each data object after the data object is copied to the NAS device 210 (e.g., due to the movement of a head over a magnetic disc).

In one embodiment, the metadata module 240 may use the queue of storage locations, the list of data objects, the data object counter, the first time period, and/or the second time period to improve the performance and/or extend the life of the NAS device 210. The metadata module 240 may collapse, collect, batch, and/or combine edits to the metadata for data objects that have been modified using the queue of storage locations and the list of data objects. The metadata module 240 may also use the first time period and the second time period to update one or more metadata for data objects without decreasing the performance of the NAS device 210. The metadata module 240 may also increase the performance of the NAS device when editing metadata for data objects that have been modified. By waiting the first time period before determining whether storage locations are in the queue of storage locations and waiting for the second time period or for a threshold number of data objects to be modified, the NAS device 210 may more efficiently modify data objects (e.g., copy a large number of data objects) to the NAS device 210 and edit the metadata for the data objects. This may allow the metadata module 240 to update a set of metadata for a set of data objects at a time, instead of updating metadata for each data object separately after the data object has been modified. By waiting for first time period, the metadata module 240 may be able to collapse, collect, batch, and/or combine edits to the metadata for a plurality of data objects. By waiting for the second period of time or waiting for a threshold number of data objects to be modified, the metadata module may be able to help ensure that metadata is edited (e.g., added, delete, updated, etc.) in a timely manner so that other uses of the NAS device 210 may have access to the metadata.

In one embodiment, the modification module 241 and editing module 242 may operate in parallel with each other (e.g., may operate simultaneously). For example, the modification module 241 may identify data objects that have been modified and/or may update the queue of storage locations, the data object counter, and/or the list of data objects while the editing module 242 updates the metadata. In one embodiment, the modification module 241 may operate within a first thread or a process (or other unit of execution) of the NAS device 210 and the editing module 242 may operate within a second thread or a process (or other unit of execution) of the NAS device 210.

Figure 3:
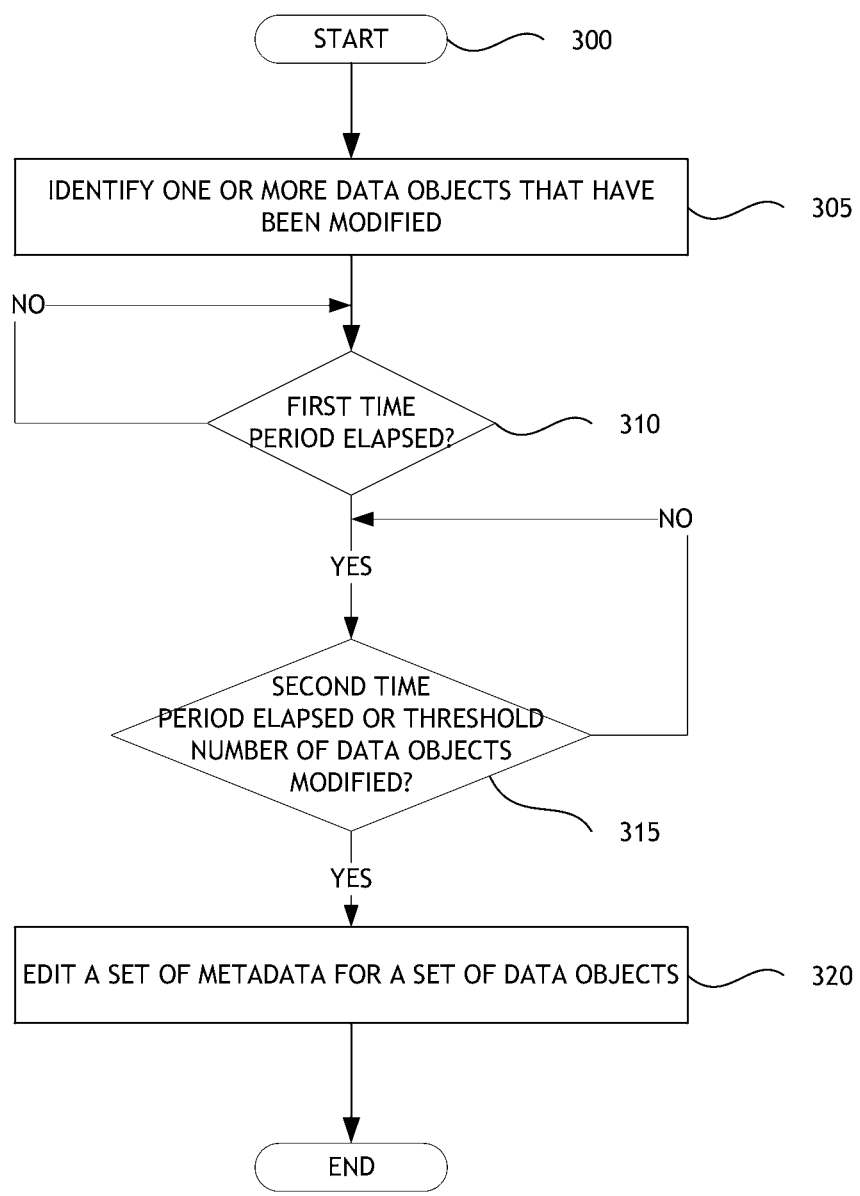
FIG. 3 is a flow diagram illustrating a process for editing metadata, according to an embodiment.

FIG. 3 is a flow diagram illustrating a process 300 for editing metadata, according to one embodiment. The process 300 may be performed by a data storage device such as a NAS device. For example, the process 300 may be performed by a metadata module (e.g., metadata module 240 as illustrated and discussed above in conjunction with FIG. 2). The metadata module may be processing logic that includes hardware (e.g., circuitry, dedicated logic, programmable logic, microcode, etc.), software (e.g., instructions run on a processor to perform hardware simulation), firmware, or a combination thereof. The process 300 begins at block 305 where the process 300 may include identifying one or more data objects that have been modified. For example, the process 300 may identify one or more data objects (e.g., files and/or folders) that have been added, deleted, changed (e.g., updated), renamed, and/or moved. The process 300 may also update a data object counter, a queue of storage locations and/or a list of data objects (as discussed above in conjunction with FIG. 2 and below in conjunction with FIG. 4). For example, the process 300 may increment the data object counter when a data object is modified, may add the data object to the list of data objects, and/or may add a storage location associated with a data object that has been modified to the queue of storage locations.

The process 300 also includes determining whether a first time period has elapsed at block 310. For example, the process 300 may use a first timer to determine whether the first time period has elapsed. If the first time period has not elapsed, the process 300 may continue to determine whether the first time period as elapsed at block 310. At block 315, the process 300 includes determining whether a second time period has elapsed or whether a threshold number of data objects have been modified, if the first time period has elapsed. For example, the process may use a second timer to determine whether the second time period has elapsed. In another example, the process 300 may use the data object counter to determine whether the threshold number of data objects have been modified (e.g., by comparing the data object counter with the threshold number of data objects). At block 320 the process 300 includes editing a set of metadata for a set of data objects if the threshold number of data objects have been modified or if the second time period has elapsed. For example, the process 300 may add, delete, and/or modify a set of metadata for the set of data objects. In one embodiment, the set of data objects may include the one or more data objects identified in block 305 and may also include additional data objects that were modified between blocks 305 and 320. After block 320, the process 300 ends.

Figure 4:
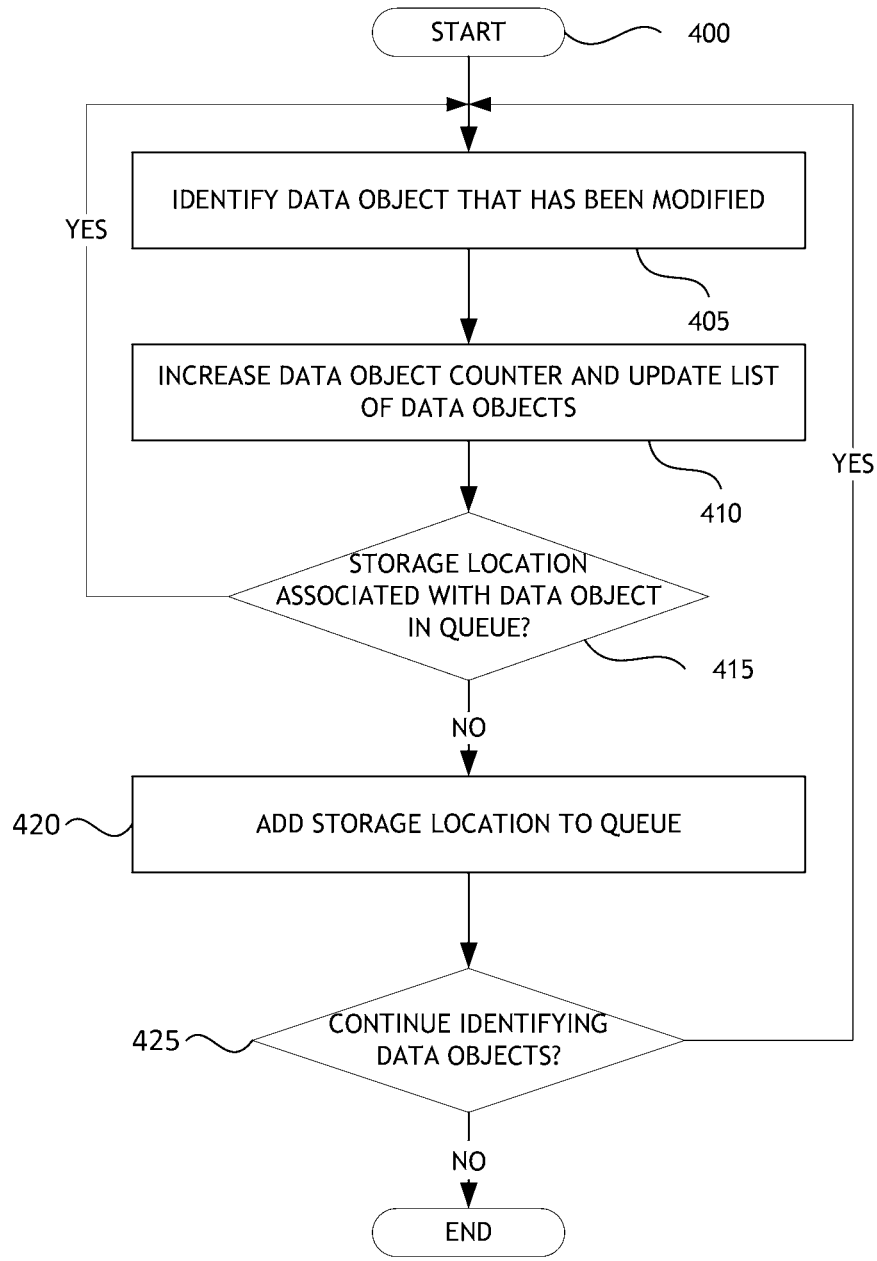
FIG. 4 is a flow diagram illustrating a process for editing metadata, according to an embodiment.

FIG. 4 is a flow diagram illustrating a process 400 for editing metadata, according to an embodiment. The process 400 may be performed by a data storage device such as a NAS device. For example, the process 400 may be performed by a metadata module (e.g., metadata module 240 as illustrated and discussed above in conjunction with FIG. 2). The metadata module may be processing logic that includes hardware (e.g., circuitry, dedicated logic, programmable logic, microcode, etc.), software (e.g., instructions run on a processor to perform hardware simulation), firmware, or a combination thereof. As discussed above, in one embodiment, the NAS device and/or metadata module may perform the process 400 illustrated in FIG. 4 in conjunction (e.g., simultaneously) with the process 500 illustrated in FIG. 5.

The process begins at block 405 where the process 500 includes identifying a data object that has been modified (e.g., added to the file system, deleted from the file system, updated, renamed, moved to a different storage location, etc.). For example, an event, message and/or other data may be received indicating that the data object has been modified. At block 410, the process 400 includes increasing a data object counter and updating a list of data objects. For example, the data object counter may be incremented in order to track the total number of data objects that have been modified in the file system of the NAS. In another example, the data object that has been modified may be added to the list of data objects in order to update the metadata for the data object (as discussed above in conjunction with FIG. 2 and below in conjunction with FIG. 5). At block 415 the process 400 includes determining whether a storage location (e.g., a folder) associated with the data object that has been modified is in a queue of storage locations. For example, the process 400 may determine whether the storage location (or data indicative of the storage location) is already within the queue of storage locations. The process 400 may continue to identify data objects at block 405 if the storage location is in the queue of storage locations. The process 400 may add the storage location to the queue of storage locations at block 420 if the storage location is not in the queue of storage locations.

At block 425, the process 400 includes determining whether to continue identifying data objects that have been modified. For example, the process 400 may determine whether the NAS device is still operating. The process 400 may continue to identify data objects at block 405 if it is determined that the process 400 should continue identifying data objects that have been modified. The process 400 may end if it is determined that the process 400 should not continue identifying data objects that have been modified.

Figure 5:
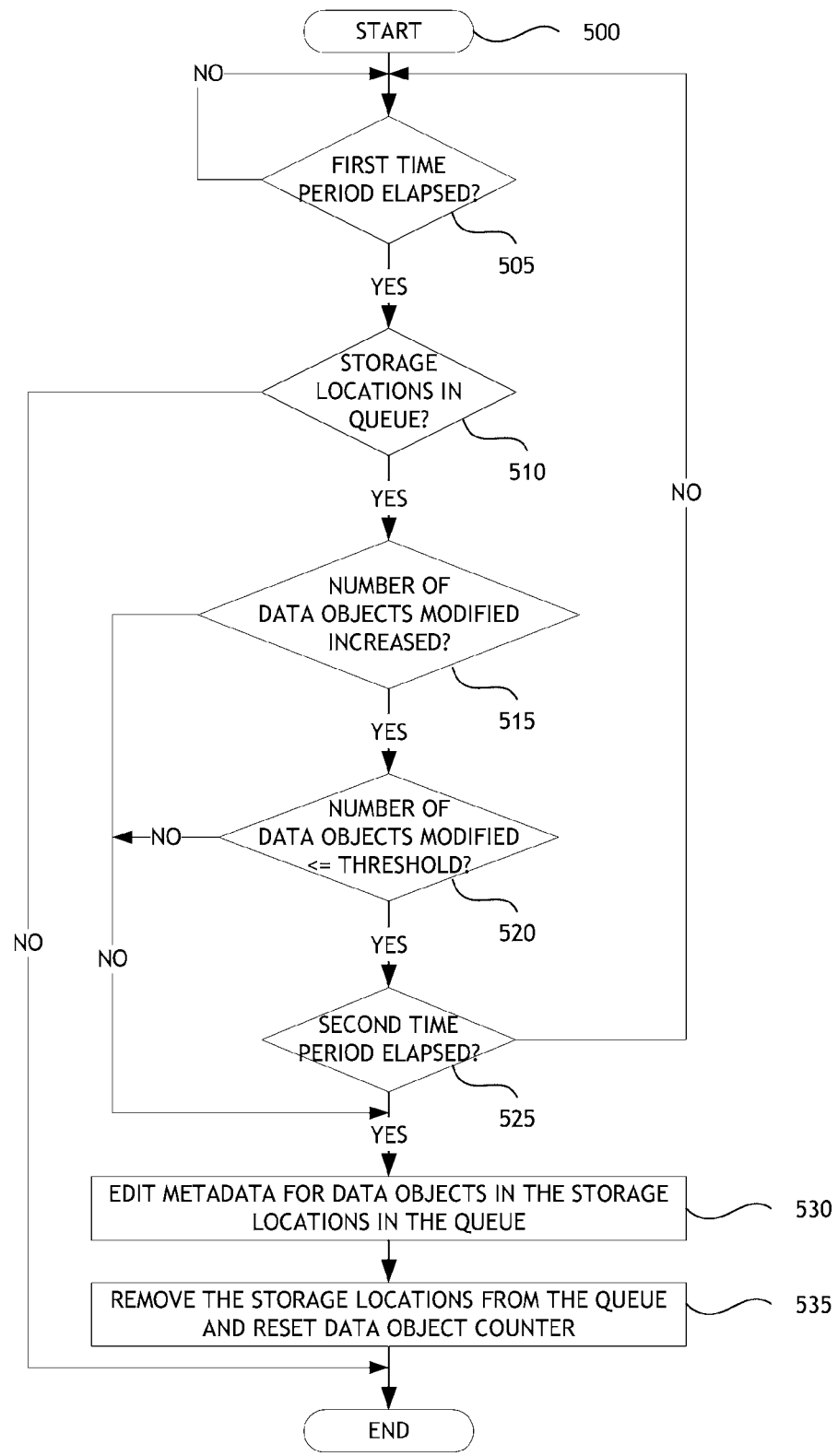
FIG. 5 is a flow diagram illustrating a process for editing metadata, according to an embodiment.

FIG. 5 is a flow diagram illustrating a process 500 for editing metadata, according to an embodiment. The process 500 may be performed by a data storage device such as a NAS device. For example, the process 500 may be performed by a metadata module (e.g., metadata module 240 as illustrated and discussed above in conjunction with FIG. 2). The metadata module may be processing logic that includes hardware (e.g., circuitry, dedicated logic, programmable logic, microcode, etc.), software (e.g., instructions run on a processor to perform hardware simulation), firmware, or a combination thereof. As discussed above, in one embodiment, the NAS device and/or metadata module may perform the process 500 illustrated in FIG. 5 in conjunction with the process 400 illustrated in FIG. 4.

At block 505, the process 500 includes determining whether a first time period has elapsed. For example, the process 500 may use a first timer to determine whether the first time period has elapsed. The process 500 may continue determining whether the first time period has elapsed at block 505 if the first time period has not elapsed. The process 500 includes determining whether there are storage locations in the queue of storage locations at block 510. If there are no storage locations in the queue, the process 500 ends. For example, if there are no storage locations in the queue, this may indicate that no data objects have been modified and the process 500 may end.

The process 500 includes determining whether the number of data objects that have been modified has increased at block 515. For example, as discussed above, the data object counter may be used to track the number of data objects that have been modified. The process 500 may determine whether the data object has been incremented or increased. If the number of data objects that have been modified has not increased (e.g., has not changed), the process 500 includes editing (e.g., adding, deleting, updating, etc.) metadata for data objects that are in the storage locations in the queue of storage locations at block 530. If the number of data objects that have been modified has increased (e.g., has changed), the process 500 includes determining whether the number of data objects that have been modified is less than or equal to a threshold number of data objects at block 520. For example, the process 500 may determine whether a data object counter (which may be used to track the number of data objects that have been modified) is less than or equal to the threshold number of data objects. If the number of data objects that have been modified is greater than the threshold number of data objects, the process 500 includes editing metadata for the data objects that are in the storage locations in the queue of storage locations at block 530.

If the number of data objects that have been modified is less than or equal to the threshold number of data objects, the process 500 includes determining whether the second time has elapsed at block 525. For example, the process 500 may use a second timer to determine whether the second time has elapsed. As discussed above, the second time period may run concurrently with the first time period and/or the first time period and the second time period may start at the same time. If the second time period has not elapsed, the process 500 includes determining whether the first time period has elapsed at block 505. If the second time period has elapsed, the process 500 includes editing metadata for the data objects (that have been modified) that are in the storage locations in the queue of storage locations at block 530. For example, the process 500 may edit metadata for data objects that are in a list of data objects and/or data objects that have been modified but are not in the list of data objects. The process 500 also includes removing the storage locations from the queue of storage locations (e.g., removing a set of storage locations from the queue of storage locations) and resetting/decrementing the data object counter at block 535. After block 530, the process 500 ends.

Additional Embodiments

Those skilled in the art will appreciate that in some embodiments, other types of distributed data storage systems may be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

What is claimed is:

1. A method, comprising:
   identifying one or more data objects that have been modified, wherein the one or more data objects are stored at one or more storage locations of a file system of a data storage device; and
   batching edits to metadata for the one or more data objects by:
   determining whether a first period of time has elapsed;
   in response to a first determination that the first period of time has elapsed, determining whether a second period of time has elapsed or whether a threshold number of data objects in the file system have been modified;
   in response to a second determination that the second period of time has elapsed or that the threshold number of data objects in the file system have been modified, editing a set of metadata for a set of data objects, wherein:
   the set of data objects comprises the one or more data objects;
   the set of metadata is stored on the data storage device; and
   editing the set of metadata comprises updating existing metadata for an existing file or an existing folder; and
   in response to a third determination that the second period of time has not elapsed and that the threshold number of data objects have not been modified, refraining from editing the set of metadata.

2. The method of claim 1, wherein identifying the one or more data objects comprises:
- determining whether a queue of storage locations comprises a first storage location associated with a first data object that has been modified; and
- in response to determining that the first storage location is not included in the queue of storage locations, adding the first storage location to the queue of storage locations.

3. The method of claim 2, further comprising:
- determining whether a number of data objects that have been modified has increased.

4. The method of claim 3, wherein determining whether the second period of time has elapsed or whether the threshold number of data objects in the file system have been modified is further in response to a fourth determination that the number of data objects that have been modified has increased.

5. The method of claim 2, wherein editing the set of metadata further comprises:
- one or more of adding or deleting metadata for the set of data objects; and
- removing a set of storage locations from the queue of storage locations.

6. The method of claim 1, wherein the one or more storage locations comprise folders in the file system.

7. The method of claim 1, wherein the set of metadata comprises one or more of a name, an author, a title, a location, a timestamp, a resolution, or a size.

8. The method of claim 1, wherein a data object has been modified when the data object has been added, deleted, updated, renamed, or moved.

9. The method of claim 1, wherein the one or more data objects comprise one or more of a file or a folder.

10. The method of claim 1, wherein the second period of time is greater than the first period of time.

11. A network-attached storage (NAS) device comprising:
- a memory configured to store data objects; and
- a processor, coupled to the memory, the processor configured to:
  - identify one or more data objects that have been modified, wherein the one or more data objects are stored at one or more storage locations of a file system of the NAS device; and
  - batch edits to metadata for the one or more data objects by:
    - determining whether a first period of time has elapsed;
    - in response to a first determination that the first period of time has elapsed, determining whether a second period of time has elapsed or whether a threshold number of data objects in the file system have been modified;
    - in response to a second determination that the second period of time has elapsed or that the threshold number of data objects in the file system have been modified, editing a set of metadata for a set of data objects, wherein:
      - the set of data objects comprises the one or more data objects;
      - the set of metadata is stored on the NAS device; and
      - editing the set of metadata comprises updating existing metadata for an existing file or an existing folder; and
    - in response to a third determination that the second period of time has not elapsed and the threshold number of data objects have not been modified, refraining from editing the set of metadata.

12. The NAS device of claim 11, wherein the processor is configured to identify the one or more data objects by:
- determining whether a queue of storage locations comprises a first storage location associated with a first data object that has been modified; and
- in response to determining that the first storage location is not included in the queue of storage locations, adding the first storage location to the queue of storage locations.

13. The NAS device of claim 12, wherein the processor is further configured to:
- determine whether a number of data objects that have been modified has increased.

14. The NAS device of claim 13, wherein the processor is configured to determine whether the second period of time has elapsed or whether the threshold number of data objects in the file system have been modified further in response to a fourth determination that the number of data objects that have been modified has increased.

15. The NAS device of claim 12, wherein the processor is further configured to edit the set of metadata by:
- one or more of adding or deleting metadata for the set of data objects; and
- removing a set of storage locations from the queue of storage locations.

16. The NAS device of claim 11, wherein the one or more storage locations comprise folders in the file system.

17. The NAS device of claim 11, wherein the set of metadata comprises one or more of a name, an author, a title, a location, a timestamp, a resolution, or a size.

18. The NAS device of claim 11, wherein a data object has been modified when the data object has been added, deleted, updated, renamed, or moved.

19. The NAS device of claim 11, wherein the one or more data objects comprise one or more of a file or a folder.

20. The NAS device of claim 11, wherein the second period of time is greater than the first period of time.

* * * * *